(No Model.)

J. OUTRAM.
ATTACHMENT FOR GRAIN DRILL TEETH.

No. 323,953. Patented Aug. 11, 1885.

ATTEST:
Nellie Holmes
Tim Brown

INVENTOR:
John Outram
by his attorney
E. C. Davidson

UNITED STATES PATENT OFFICE.

JOHN OUTRAM, OF EASTON, MARYLAND.

ATTACHMENT FOR GRAIN-DRILL TEETH.

SPECIFICATION forming part of Letters Patent No. 323,953, dated August 11, 1885.

Application filed June 2, 1885. (No model.)

*To all whom it may concern:*

Be it known that I, JOHN OUTRAM, a citizen of the United States, residing at Easton, in the county of Talbot and State of Maryland, have invented a new and useful Attachment for Grain-Drill Teeth, of which the following description and claims, taken in connection with accompanying drawings, are a full, clear, and exact specification, sufficient to enable those skilled in the art to which my invention relates to make and use the same.

Much difficulty is experienced in the operation of grain-drills, owing to varying conditions of the soil, some being soft and light, others stiff and heavy, and this is particularly noticeable in undulating lands and in seasons of unusual drought or rain.

It is well known that the ordinary drill-teeth penetrate into a soft or light soil to a greater depth than in a soil which is stiff or heavy, and that when the teeth strike any obstruction and are thereby lifted out of the ground, on the rebound they bury their points to an unusual depth; also, that in very hard, stiff land the teeth will not ordinarily penetrate the ground sufficiently to cover the grain. By reason of these and other difficulties the grain is either not seeded to a uniform depth or not uniformly covered, or both, and consequently does not come up evenly and all together or not at all.

My invention has for its object to provide means for regulating at will the depth to which the drill-teeth take into the ground, no matter what the condition of the soil, as well as to cover effectually the grain deposited in the furrows formed by the drill-teeth.

Figure 1:
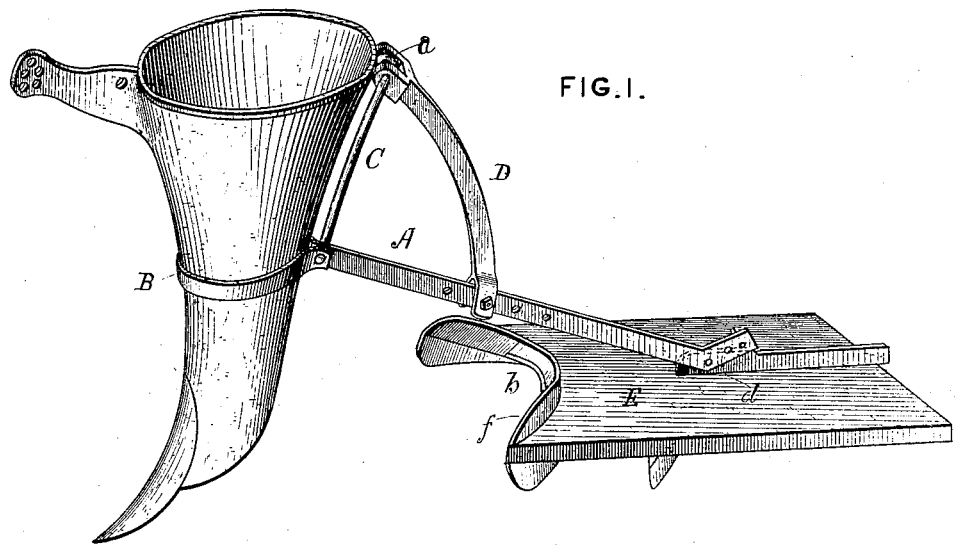
Figure 2:
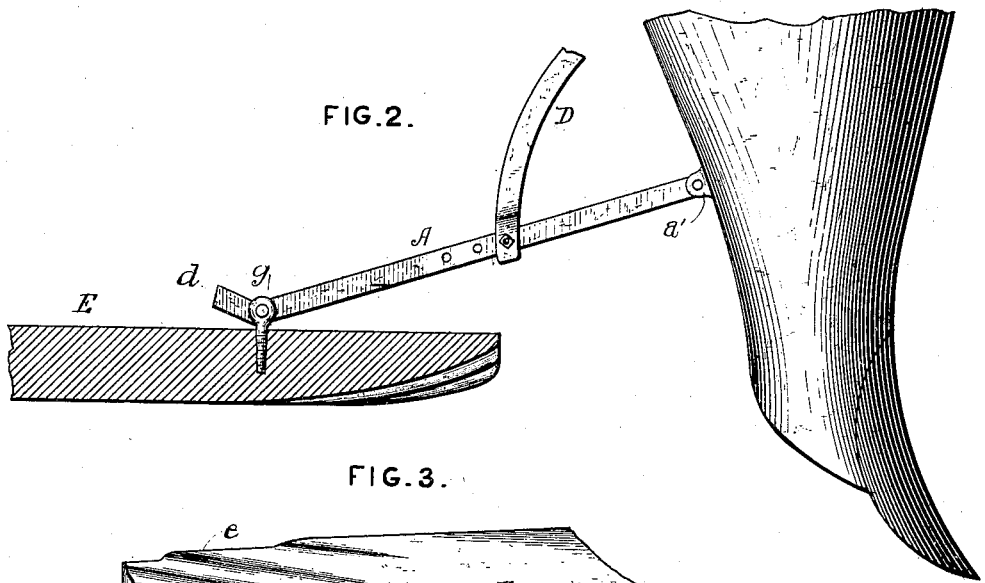
Figure 3:
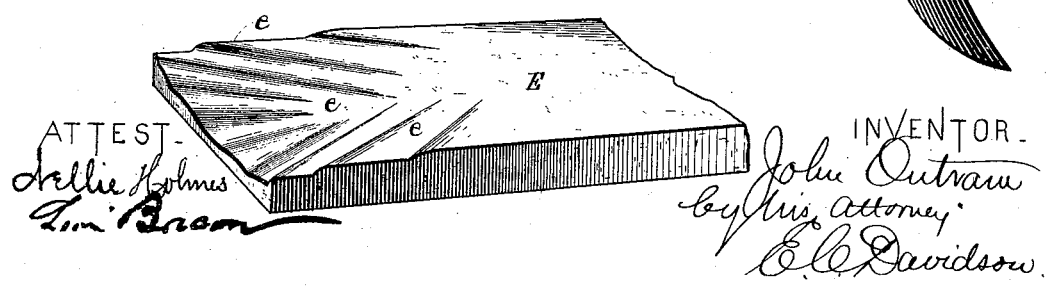

In the drawings, Figure 1 is a perspective view of an ordinary drill-tooth with my attachment applied. Fig. 2 is a side elevation of a drill-tooth formed especially to receive my attachment, and Fig. 3 is a perspective view of the under side of the shoe.

To an ordinary drill-tooth I detachably connect a rearwardly-extending bar, A, by means of a band, B, encircling and clasped upon the lower part or shank of the tooth. To prevent this band from slipping down on the tooth, I connect it by means of a link, C, with the usual lug, $a$, at the top and rear of the tooth, to which the chain for raising the tooth is generally fastened. From this lug I run a brace, D, downward and backward and give it an adjustable connection with the bar A, thereby firmly bracing and staying the bar against all vertical movement, and at the same time permitting the adjustment up and down of its rear end. To the rear end of the bar I pivot a shoe or runner, E, (preferably of wood.) This shoe is sufficiently wide to straddle the furrow made by its tooth and rest upon the adjoining ridges with either edge at about the center of the ridge. I have found it advantageous to hollow this shoe out at its forward end, as shown at $b$, and provide its under side with ridges or ribs $e$, extending and converging toward the rear of the shoe, for deflecting the earth from the ridges into the center of the furrow, thus effectually covering the grain. In some instances, also, it is desirable to provide the front edge of the shoe with a guard, $f$, to prevent the earth from passing over or piling up on the shoe. The adjustable connection between the brace D and the shoe-supporting bar, whereby the drill-tooth is permitted to penetrate more or less into the ground, may be of any kind, holes $c$ along the length of the bar and a bolt or pin passing therethrough and fastening the brace and the rod together, as shown in the drawings, being a convenient form.

In order to prevent the shoe from turning a somersault in case of striking a stone, clod, or other obstruction, I extend the shoe-supporting bar slightly to the rear of the pivot, and turn up its extreme end, as at $d$, thereby forming a stop against which the rear portion of the shoe would strike.

In addition to the adjustable connection of the brace to the shoe-supporting bar, I may also adjustably connect the shoe to the bar, so as to allow more or less fore-and-aft tilt or play. This, in the construction shown in Fig. 1, is done by means of a pin passing through one of several holes in the turned-up rear end of the bar and bearing upon the top of the rib on the shoe in which the bar is pivoted; but in the construction shown in Fig. 2 it will only be necessary to slightly turn the screw-eye $g$, so as to vary the distance of the pivot-point from the top of the shoe. In Fig. 2 is shown a drill-tooth formed with a lug, $a'$, to receive the forward end of the bar at about the point where the band in the other construction is passed. This, while doing away with the clasp and the link, is more expensive, requiring a special construction of tooth. I have also contemplated drilling a hole in the tooth at the same point and passing the shank of a screw-eye similar to *g* through and riveting it on the inside of the drill-tooth. But the choice of these fastenings is left to the skill, taste, or convenience of the user.

It will be seen that by pivoting the shoe midway of its length on the supporting-bar, no matter what the adjustment and inclination of the bar or what the inequalities of the ground may be, the whole surface of the shoe bears upon the ground; also, that the hollowed front end and the converging ribs on the under side gather the earth from the ridges and deflect it into the furrow over the grain. These converging ribs also pulverize and crumble the clods, and leave the ground in excellent condition.

I am aware that smooth flat metal runners rigidly fastened to the rear end of spring-supporting bars have been tried, and also that wheels hung to adjustable rigid bars have been used; but in the first the amount of surface of the runner in contact with the ground varies with the adjustment and inclination as well as the yielding of the bar, and in the second the small amount of surface bearing on the ground is not sufficient, and the rolling of the wheel mashes down the soil and leaves it hard, without any crumbling or pulverizing action, and does not cover the seed well.

What I claim, and desire to secure by Letters Patent, is—

1. The combination, with a drill-tooth, of the shoe-supporting bar, the brace adjustably connected to the bar, and the shoe pivoted midway of its length to the rear end of the bar, substantially as described.

2. The combination, with a drill-tooth, of the shoe-supporting bar, the brace adjustably connected to the bar, and the shoe pivoted midway of its length to the rear end of the bar, and means, substantially as described, for limiting the tilting or rocking of the shoe on its pivot.

3. The combination, with a drill-tooth, of a rearwardly-extending shoe-supporting bar, a shoe or runner pivoted midway of its length to the rear end of the bar, and means, substantially as described, for attaching the bar to the drill-tooth.

4. The combination, with a drill-tooth, of the shoe-supporting bar, the brace adjustably connected to the bar, the shoe pivoted midway of its length to the rear end of the bar, and provided on its under side with the rearwardly-converging ridges, and means, substantially as described, for connecting the bar and brace to the drill-tooth.

5. The combination, with the drill-tooth, of the pivoted rearwardly-extending shoe-supporting bar, the brace pivoted at the top of the tooth and adjustably connected at its lower end with the bar, the shoe pivoted midway of its length to the rear end of the bar, and provided with the converging ridges on its under side and the guard on its forward end, and means, substantially as described, for detachably connecting the shoe-bar and its brace to the drill-tooth.

6. The combination, with the drill tooth, of the rearwardly-extending pivoted shoe-supporting bar, the pivoted brace adjustably connected to the bar, the shoe pivoted midway of its length to the rear end of the bar, and provided with means, substantially as described, to limit its rocking or tilting movement on its pivot, and having the ridges on its under side and the guard on its upper front end, and the means described for detachably connecting the supporting-bar and its brace to the drill-tooth.

In testimony whereof I have hereunto set my hand this 25th day of April, 1885.

JOHN OUTRAM.

Witnesses:
S. ALEX. BENSON,
HENRY SHREVE.